(12) United States Patent
Hughes et al.

(10) Patent No.: US 7,519,592 B2
(45) Date of Patent: Apr. 14, 2009

(54) METHOD, APPARATUS AND COMPUTER PROGRAM FOR KEY WORD SEARCHING

(75) Inventors: Ian Hughes, Southampton (GB); Nicholas James Midgley, Waterlooville (GB)

(73) Assignee: International Business Machines Corporation, Armonk, NY (US)

(*) Notice: Subject to any disclaimer, the term of this patent is extended or adjusted under 35 U.S.C. 154(b) by 582 days.

(21) Appl. No.: 10/940,304

(22) Filed: Sep. 14, 2004

(65) Prior Publication Data

US 2005/0086212 A1   Apr. 21, 2005

(30) Foreign Application Priority Data

Sep. 23, 2003   (GB) ................... 0322202.3

(51) Int. Cl.
 *G06F 7/10* (2006.01)
 *G06F 17/00* (2006.01)

(52) U.S. Cl. .................................... 707/6; 715/216
(58) Field of Classification Search .............. 707/3, 707/10, 103, 203; 715/206
See application file for complete search history.

(56) References Cited

U.S. PATENT DOCUMENTS

| | | | | |
|---|---|---|---|---|
| 6,009,459 | A * | 12/1999 | Belfiore et al. | 709/203 |
| 6,037,934 | A * | 3/2000 | Himmel et al. | 715/760 |
| 6,212,522 | B1 * | 4/2001 | Himmel et al. | 707/10 |
| 6,366,906 | B1 | 4/2002 | Hoffman | |
| 6,493,702 | B1 * | 12/2002 | Adar et al. | 707/3 |
| 6,526,402 | B2 | 2/2003 | Ling | 707/3 |
| 7,010,568 | B1 * | 3/2006 | Schneider et al. | 709/203 |
| 2002/0116411 | A1 * | 8/2002 | Peters et al. | 707/501.1 |
| 2002/0129164 | A1 * | 9/2002 | Van Der Meulen et al. | 709/239 |

(Continued)

FOREIGN PATENT DOCUMENTS

| | | |
|---|---|---|
| EP | 1267282 A1 | 12/2002 |
| EP | 1271350 A1 | 1/2003 |
| WO | WO0048057 * | 8/2000 |
| WO | 02/35387 A1 | 5/2002 |

OTHER PUBLICATIONS

"Virtual URLs for Browsing and Searching Large Information Spaces" Research Disclosure 1238, Sep. 1998: 2 pages.

*Primary Examiner*—Cheyne D Ly
(74) *Attorney, Agent, or Firm*—Arthur J. Samodovitz (57) ABSTRACT

System, method and computer program for initiating a search at a server computer. A data base including a URL of the server computer is stored at a client computer. Information entered by a user into the client computer is received. From the information, a search term and the URL of the server computer are identified. Then, an HTTP search request which includes the URL of the server computer and the search term is generated. Then, the HTTP search request is sent to the server computer. The identifying of the URL of the server computer comprises searching the data base for a character string contained in the information that matches the URL of the server computer. The identifying of the search term comprises identifying a portion of the information appended to the URL of the server. The identifying of the search term also comprises omitting from the portion one or more symbols adjacent to the search term which are inconsistent with a search request using HTTP. The generating of the HTTP search request which combines the URL of the server computer and the search term comprises inserting adjacent to the search term one or more symbols consistent with a search request using HTTP.

11 Claims, 9 Drawing Sheets

U.S. PATENT DOCUMENTS

| | | | |
|---|---|---|---|
| 2002/0188603 A1 | 12/2002 | Baird et al. | 707/3 |
| 2003/0084034 A1 | 5/2003 | Fannin | 707/3 |
| 2008/0005342 A1* | 1/2008 | Schneider | 709/230 |

* cited by examiner

METHOD, APPARATUS AND COMPUTER PROGRAM FOR KEY WORD SEARCHING

FIELD OF THE INVENTION

The present invention relates generally to key word searching, and more particularly to key word searching at Web sites.

BACKGROUND OF THE INVENTION

A user typically does not know the structure of a Web site or the Uniform Resource Identifiers (URIs) to access specific content within the Web site. Consequently, the users will load the home page, and then navigate within the Web site by clicking hyperlinks or select a search engine option. The search engine requires that the user fill out a form with key word search terms and other criteria, or at least provide search terms into a search-specific entry field. A similar sequence of user interactions is required to initiate an LDAP directory search or a search via an Internet search engine such as "Google" (tm) program. (Google is a Trade Mark of Google Technology Inc. in the US and other countries.) The user initially loads a Web page and then fills in a form to generate an LDAP directory search request or a Google search request.

Many Internet users currently access Web sites via a conventional telephone connection or via mobile communications, which are slow. So, it is time consuming for the user to interact with remote servers and fetch web pages. Any unnecessary user interactions and web page fetches can result in significant delay in obtaining a Web page containing information of genuine interest.

It is known in conventional file transfer request processing within the World Wide Web Internet service for a Web server to check the syntax of URIs within received client requests. In the case of Hypertext Transfer Protocol (HTTP) requests, an invalid request syntax is reported to the requesting client as an error using HTTP status code 400. URI syntax rules are set out in the Internet Engineering Task Force's (IETF's) Request for Comments 1630, Tim Berners-Lee, 1994.

Another problem with conventional access to Web sites is that a failure to find a requested page is typically reported to the user as a "document not found" error with no explanation of the specific cause of the error. In the absence of any guidance for future interactions, the user typically reloads the previously-accessed page, types a new Uniform Resource Locator (URL) into his or her Web Browser's user entry field, or gives up the search.

Another known failure scenario corresponds to failure by a receiving server to locate a requested Web page or other resource. Within conventional HTTP processing, failure to find a requested Web page is reported to the requesting client using the HTTP status code 404 ("Resource Not Found" error code). Other 4XX HTTP status codes are known for reporting apparent error conditions relating to client requests. A number of 5XX HTTP status codes are known for reporting problems where the server appears to have erred.

International Patent Application Publication No. WO 02/35387, published 2 May 2002, describes a searching procedure in which a search request string, including a valid locator (URL) for a search engine and at least one search term, is parsed and separated into a locator and a search string. The search string is then submitted to a search engine having the specified locator. Data returned from the search engine is passed back to the user and displayed. WO 02/35387 allows the user to enter search criteria in a Web Browser's entry field, but requires the user to enter a valid URL pointer to a search engine.

Subject to user preferences, it is known for an unrecognised URI or text (entered into a user entry field) to be sent by Microsoft Internet Explorer Web Browser to the MSN search Web site to initiate a search on the Internet. A user may set his or her preferences to specify an alternative default search service. However, the default mechanisms within the Microsoft Internet Explorer Web Browser do not allow Web site searching to be carried out in response to search context information which is limited to specific Web sites.

The question mark symbol '?' is known to delimit a boundary between a URI of a queryable object and a set of words expressing a query on that object. (The use of '?' to delimit a boundary is defined in the IETF Network Working Group's Request for Comments 1630 "Universal Resource Identifiers in WWW—A Unifying Syntax for the Expression of Names and Addresses of Objects on the Network as used in the World-Wide Web", Tim Berners-Lee, CERN, June 1994).

A general object of the present invention is to facilitate searches by a user, targeted to specific Web sites.

SUMMARY OF THE INVENTION

The present invention resides in a system, method and computer program for initiating a search at a server computer. A data base including a URL of the server computer is stored at a client computer. Information entered by a user into the client computer is received. From the information, a search term and the URL of the server computer are identified. Then, an HTTP search request which includes the URL of the server computer and the search term is generated. Then, the HTTP search request is sent to the server computer. The identifying of the URL of the server computer comprises searching the data base for a character string contained in the information that matches the URL of the server computer. The identifying of the search term comprises identifying a portion of the information appended to the URL of the server.

In accordance with features of the present invention, the identifying of the search term also comprises omitting from the portion one or more symbols adjacent to the search term which are inconsistent with a search request using HTTP. The generating of the HTTP search request which combines the URL of the server computer and the search term comprises inserting adjacent to the search term one or more symbols consistent with a search request using HTTP.

In accordance with another feature of the present invention, the client computer determines that the information does not conform to HTTP. The identifying from the information a search term and the URL of the server computer, and generating an HTTP search request which includes the URL of the server computer and the search term are performed in response to the determining that the information does not conform to HTTP.

In accordance with another feature of the present invention, an additional URL of an additional server computer is stored in association with the URL of the first said server computer. In response to identifying from the information the search term and the URL of the server computer, identifying the additional URL of the additional server computer. Another HTTP search request is generated which includes the additional URL of the additional server computer and the search term. This other HTTP search request is sent to the additional server computer.

The present invention provides methods, apparatus and computer programs for searching within data accessible via a specified server data processing apparatus (such as a server data processing apparatus running a Web server or directory server). In response to data entered into an entry field of a client requester program (such as a Web Browser) running on a client data processing apparatus, a search request is generated using information stored at the client data processing apparatus. The stored information comprises an identifier of a server data processing apparatus and may include search requirements specified by computer programs running on the server data processing apparatus. The client requester program is a computer program for use at a client data processing apparatus for sending requests for information or other services to, and receiving responses from, a server data processing apparatus. The terms 'client' and 'server' as used herein indicate the relationship between (1) an apparatus or program that requests information or other services (the 'client') and (2) an apparatus or program ('server') that processes the request and sends a response back to the requester client. The invention may be implemented to enable initiation of searches without the need to locate a search form or field within a downloaded Web page, or to enter search terms into a page-specific form or field within a downloaded page.

A first embodiment of the invention provides a search manager for initiating a search in response to data entered within an entry field of a client requester program. The search manager includes program code for accessing a cache or other data storage unit to retrieve a stored searchbase. A 'searchbase' in the context of the present specification includes an identifier of a specific server data processing apparatus. In one embodiment of the invention, the searchbase also identifies a portion of the resources accessible via the server data processing apparatus and can be used to determine a search scope. The searchbase may include a base portion of a URI identifying a Web site (such as 'www.abcd.com') or a more complete URI path identifying a Web site portion (such as 'www.abcd.com/xxx/yyy'). Alternatively, the searchbase may identify a directory, a database, a file system, or a portion thereof. The search manager includes program code for responding to a search term (or terms) entered within the client requester program's entry field, by generating a search request including the stored searchbase and the search term(s). This generated search request is in a format which is suitable for processing by a server identified by the searchbase, which may not be the case for the data as entered in the entry field. A search can be initiated without requiring a user to enter a valid URI pointer to a search engine. The generated search request is sent to the server identified by the searchbase, to initiate a search for the search term(s).

In one embodiment of the invention, the searchbase is used at the receiving server to determine the scope of a search for the search term or terms. For example, if the searchbase is 'www.abcd.com/efg' and the search term is 'paragliding', a search will be performed for the term 'paragliding' within portion 'www.abcd.com/efg' of a Web site 'www.abcd.com'.

According to certain embodiments of the invention, network-accessible resources such as Web pages and directory objects accessible via a number of Internet-connected server computers include meta data tags. The meta data tags include at least one searchbase identifying a target server data processing apparatus. The searchbase may also be usable to delimit a portion of the resources accessible via the target server—such as if the searchbase is a base portion of a URI identifying a specific Web site or portion of a site. The meta data may include additional search parameters, such as an identification of a specific search service to be used. When a first Web page of the site is downloaded to the user's computer, the meta data within the downloaded page is identified by the search request manager and stored in the client requester program's cache. If one or more search terms are subsequently entered into the client requester program's entry field and the search manager determines that a search request should be generated, the search manager generates a search request which the client requester program sends to a server identified by the searchbase. The generated search request includes the cached searchbase and, delimited from the searchbase, the search terms entered in the entry field.

In one embodiment of the invention, the generation of a search request is performed in response to determining that the data entered in the client requester program's entry field includes a trigger data element. The trigger data element may be the stored searchbase itself, or a base portion of an alternative URI stored in association with the searchbase. It is not essential for each generated request to include a URI entered in the entry field. For example, if stored meta data specifies alternative or additional search sites as search parameters associated with a cached searchbase, the search manager may generate search requests with URIs relevant to the alternative or additional sites. Additional search parameters may be included in generated search requests. In another embodiment, the trigger data element may be a special search character (such as, for example, 'search?').

In another embodiment of the invention, the generation of a search request is performed in response to identification of error conditions, such as a determination that the data entered in the client requester program's entry field is not a valid, resolvable URI. For example, the generation of search requests may be in response to HTTP 404 "Document Not Found" errors, or identification of syntax errors. In another embodiment, the search manager controls the client requester program to display a 'search' button or menu item, which the user can select to initiate generation of a search request.

The search performed at the server may be carried out by the receiving server's default search service, or a search service which is specified in the stored meta data may be specified in the generated search request. The server returns results to the data processing apparatus running the client requester program and search manager. The search manager aggregates responses (if there are a plurality of relevant responses) for display by the client requester program. In one embodiment, the aggregation of responses includes filtering and ordering of responses (based on parameters such as different 'weightings' for different content-providing sites, dates, data size, or content type).

Embodiments of the invention thus enable dynamic determination of a target server to which a search request is sent in response to server-specific meta data and search information entered in an entry field of a client requester program such as a Web Browser. The meta data may identify (either explicitly or implicitly) a specific search service, whereas the data entered in the entry field includes one or more search terms. The meta data, or the entered data, may include a search-scope-determining URI base portion.

A further embodiment of the invention provides a data object including embedded meta data tags for use by a search manager and a Web server in a method for controlling searching within a network as described above. The meta data specifies a searchbase such as a URI base portion which is identifiable by a search manager to initiate searches within a specific Web site or directory. The meta data may include additional search parameters such as an identification of a preferred search service. Other search parameters may also be included in the meta data.

The search manager may be implemented as a computer program product, such as computer program code designed to interface with a conventional Internet Web Browser. The program code may be made available as a program product

DETAILED DESCRIPTION OF THE PREFERRED EMBODIMENTS

Figure 1:
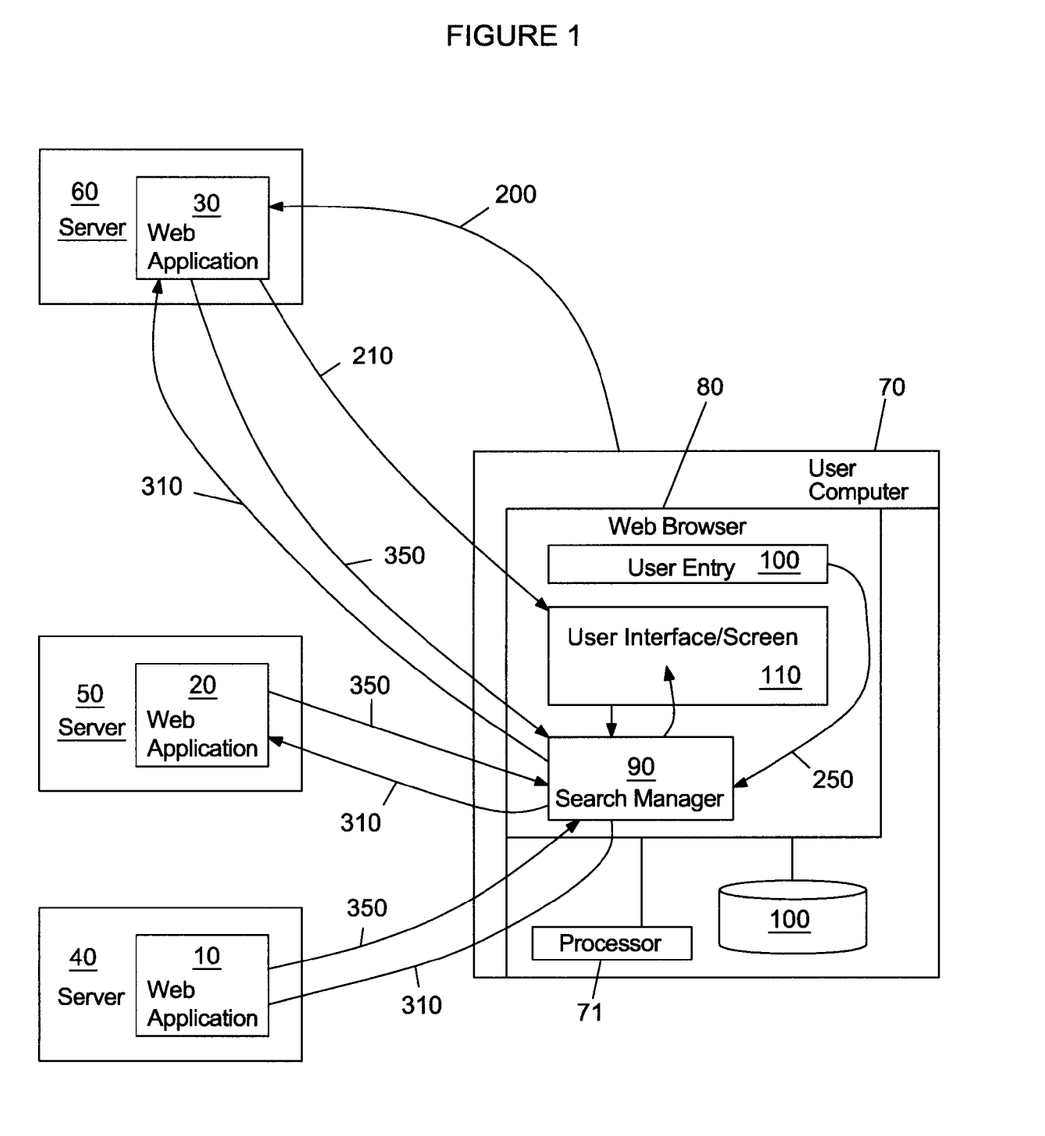
FIG. 1 shows interactions between a Web Browser and a number of Web servers within a computer network such as the Internet, according to an embodiment of the invention.

The present invention will now be described in detail with reference to the figures. Like reference numbers indicate like elements throughout. FIG. 1 shows a number of components of a data processing network, including a number of Web Server applications 10, 20, 30 running on server computers 40, 50, 60, respectively that are connected for communication with a user's computer 70. The user's computer 70 with a processor 71, is running a Web Browser program 80 and a search manager program 90 which interfaces with the Web Browser 80. As is known in the art, a Web Browser is with a processor 71, an application program which is capable of sending Hypertext Transfer Protocol (HTTP) requests to Web servers to access information on the World Wide Web Internet service. Alternative embodiments of the present invention include browsers or other client requester programs which support the File Transfer Protocol (FTP), Lightweight Directory Access Protocol (LDAP) or other protocols for sending requests.

Each of the user computer 70 and the server computers 40, 50, 60 may be remote from each other and coupled via one or more networks. For example, user computer 70 may be coupled to server computers 40, 50 and 60 via the Internet and accessible via the World Wide Web Internet Service, to enable user computer to request web pages. The user computer 70 and the server computers 40, 50, 60 could also be coupled via a local network or intranet.

The user computer 70 is not limited to a particular type of data processing apparatus, and may be a conventional desktop or lap-top personal computer, a personal digital assistant (PDA) or another specialized data processing device which is capable of running a client requester program. The user computer 70 may connect to a network of data processing systems via wireless or hardwired connections. Similarly, the server computers 40, 50, 60 can be any data processing apparatuses which are capable of running a Web server application, directory server or similar server program. Software-implemented elements of the embodiment described in detail below are not limited to any specific operating system or programming language.

In one embodiment of the present invention, the search manager 90 is implemented as a computer program which extends and modifies the functions of a standard Web browser. In particular, this embodiment provides a "plug-in" program module for connecting to a standard connection interface of Netscape Corporation's Netscape Communicator Web Browser program. As is known in the art, "plug-in" modules are programs that can be easily installed and used as part of a Web browser—once installed, "plug-in" modules are recognized automatically by the Web Browser 80, and the Web Browser 80 and plug-in modules call each other's functions via simple APIs. A number of "plug-in" components are already widely available for use with Microsoft Corporation's Internet Explorer 5 or Netscape Corporation's Netscape Communicator Web Browsers. Because the interfaces and development of "plug-in" components to add functions to an existing Web Browser are understood by those skilled in the art, the interfaces and development steps will not be described in detail herein.

The search manager 90 cooperates with the Web Browser 80 to respond to entry of a search request within an entry field 100 of the Web Browser's user interface/screen 110. A search request is sent to one or more specified Web servers 10, 20, 30 to initiate searching within one or more specific Web sites for content relevant to the request. The Web site to be searched may be the site currently being visited by a user, but in certain embodiments of the present invention, the search request may be passed to an alternative specified site or multiple sites. Automated searching is performed in response to entry of search text into a Web Browser's main user entry field 100— the entry field which is conventionally used for entering Uniform Resource Locator (URL) and other Uniform Resource Identifier (URI) information. Enabling the user to enter search text directly into a generally available entry field improves the user experience by avoiding the need to locate a search bar or form within a previously loaded page or via a Web link. The Browser directs a request to the search engine of the site of interest. The site to be searched is specified within cached meta data of the downloaded page (and need not be the current site being visited). In particular, the search manager 90 enables the interception and processing of search criteria in the URI field 100, overriding the default handling by the Web Browser program, which typically presents users with a "Document Not Found" error when an unknown URI (resulting from the inclusion of the search criteria) is typed into the Web Browser's entry field 100.

Figure 2:
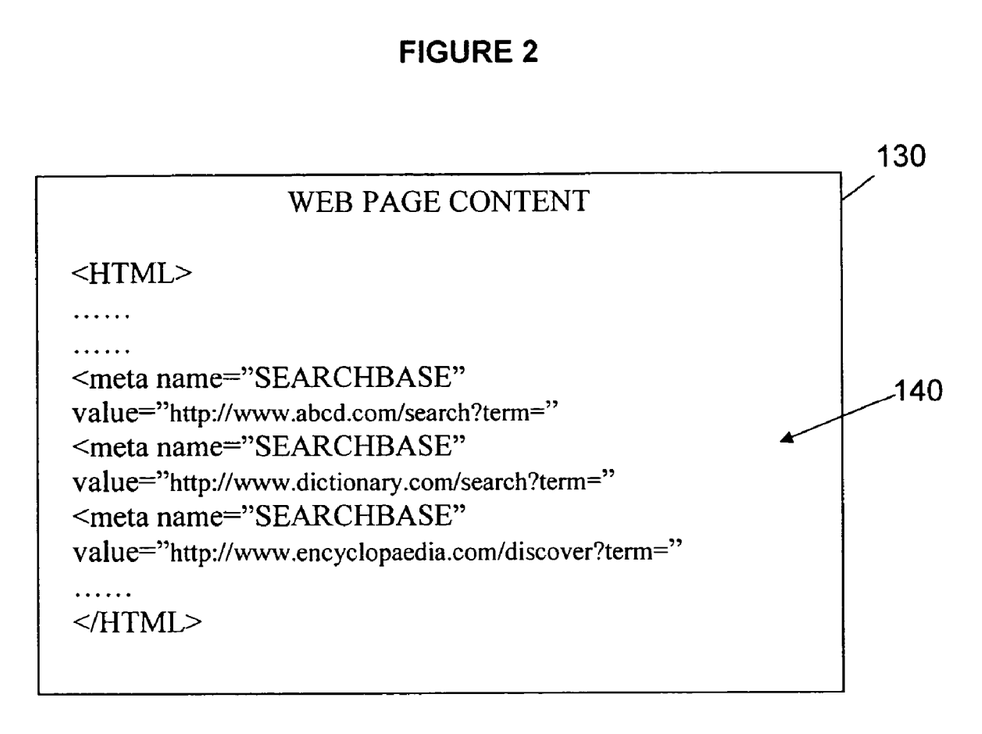
FIG. 2 shows an example of meta data tags embedded within HTML source of a Web page.

Described below in detail are operations performed at client and server computers to search for content according to a number of embodiments of the present invention. To enable operation of the search manager 90 in cooperation with the Web Browser 80, supporting information is provided for each Website for which the above-described search functions are to be enabled. This information is in the form of prescriptive meta data detailing a URI base portion which will be used for initiating a search. The meta data also includes optional parameters for use by the search component of a Web site (as described below). Content developers can include the meta data by embedding meta data tags 140 within HTML source of each Web page 130 within the site (or within each of a subset of Web pages from which searching is to be enabled). An example of such meta data tags 140 is shown in FIG. 2. Subsequently, when a Web page 130 is loaded 210 in response to an HTTP request (step 200 of FIG. 3), the plug-in search manager 90 extracts the meta data (step 220), and the meta data is saved 230 in the Browser's cache 120. As new pages are loaded, the cached meta data information can be updated to provide alternative searchbases (used for directing search requests from the search manager—as described below) and to provide context-sensitive searchbases (step 230). In this embodiment of the present invention, a searchbase contains a URI identifying a Web site or a portion of a Web site. Content developers may prescribe either a single common searchbase for an entire Web site or multiple searchbases for a Web site through multiple meta specifications within the HTML content of a page, or different meta specifications on different pages. Where multiple searchbases are specified, the "plug-in" search manager acts as a broker for search requests—issuing search requests to Web servers or directory servers corresponding to all the specified searchbases.

Figure 3:
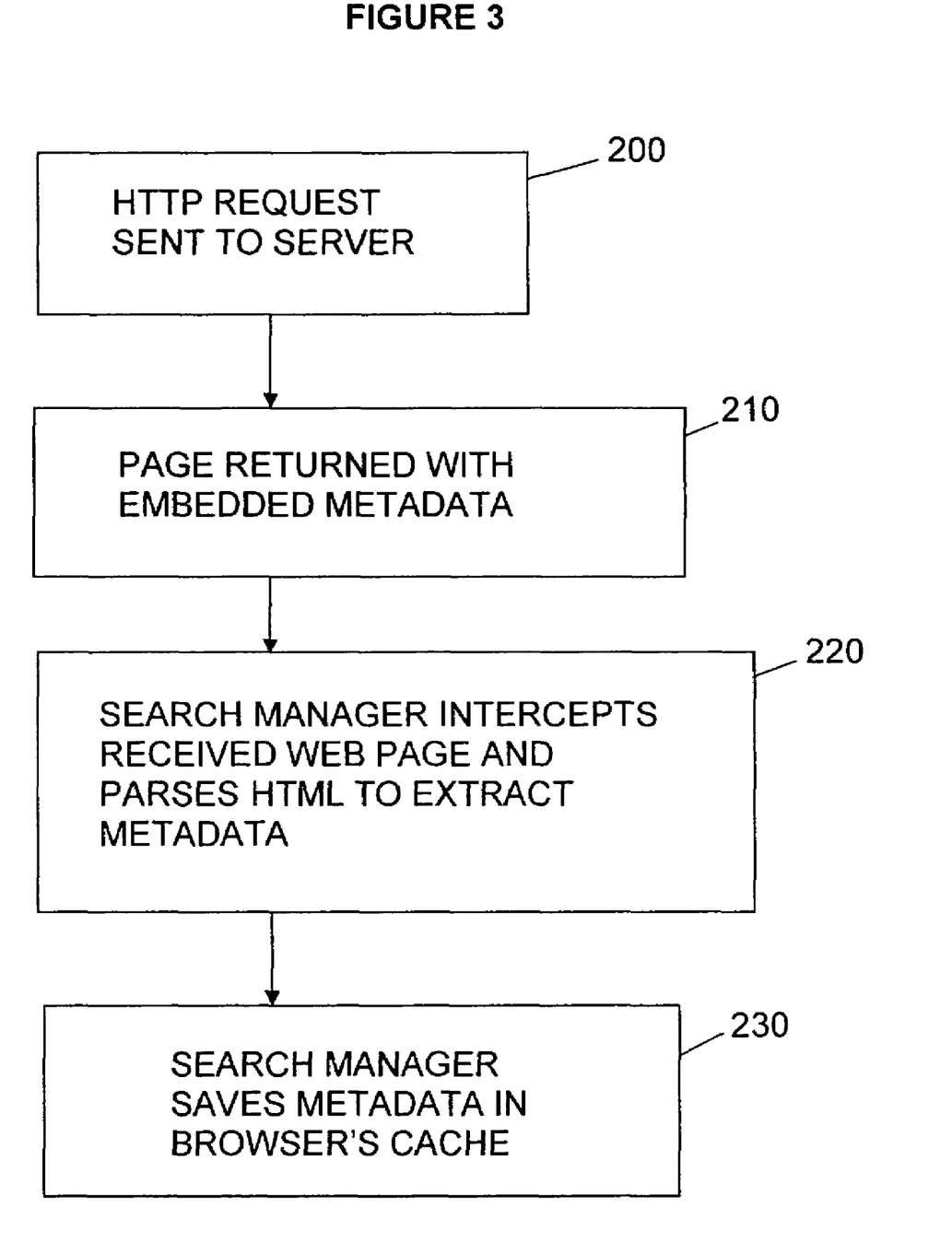
FIG. 3 shows a sequence of steps of a computer program providing meta data to a Web client, in accordance with an embodiment of the invention.
Figure 4A:
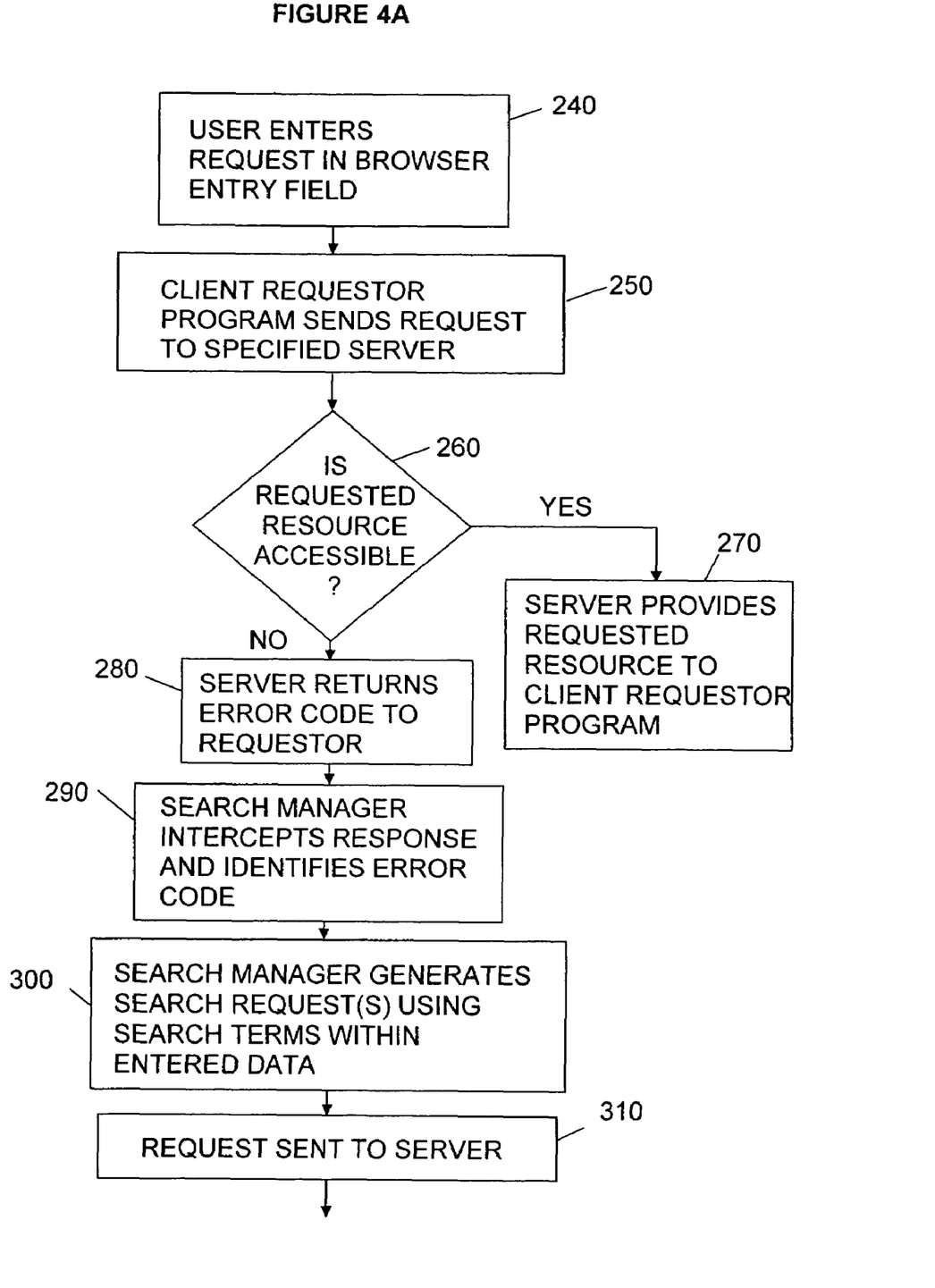
FIGS. 4A and 4B shows a sequence of steps of a computer program for searching in response to user-entered data, in accordance with an embodiment of the invention.
Figure 4B:
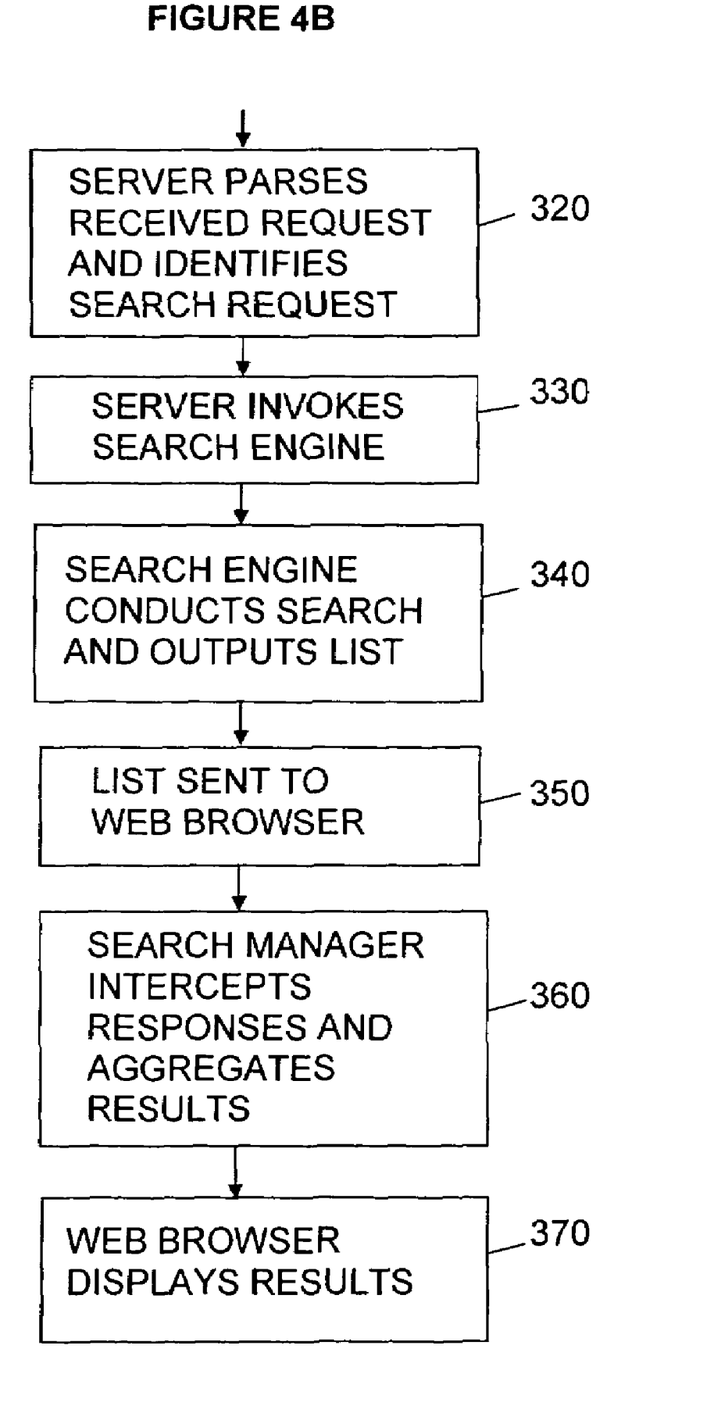
Figure 5:
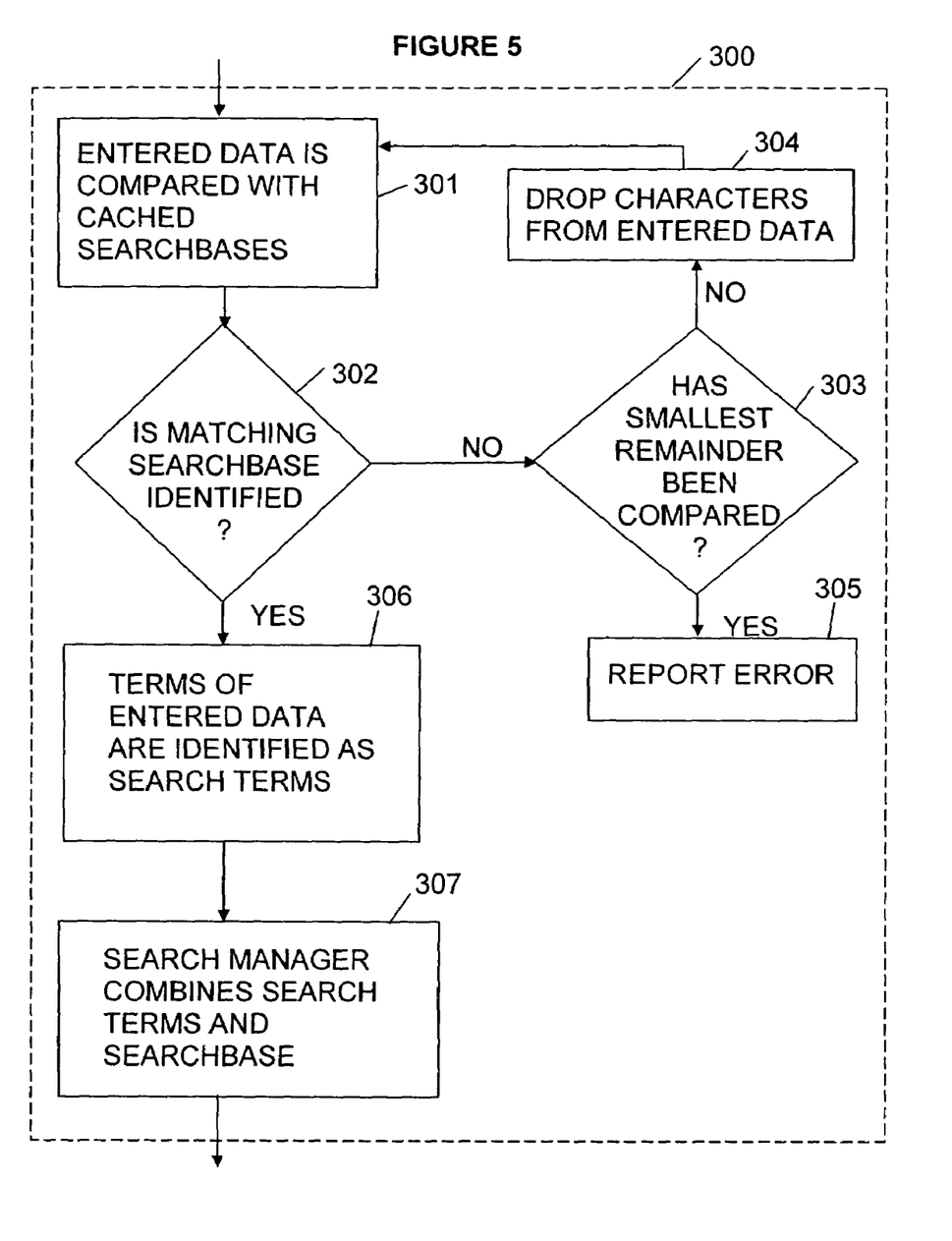
FIG. 5 shows a more detailed sequence of steps represented as step 300 in FIG. 4.
Figure 6:
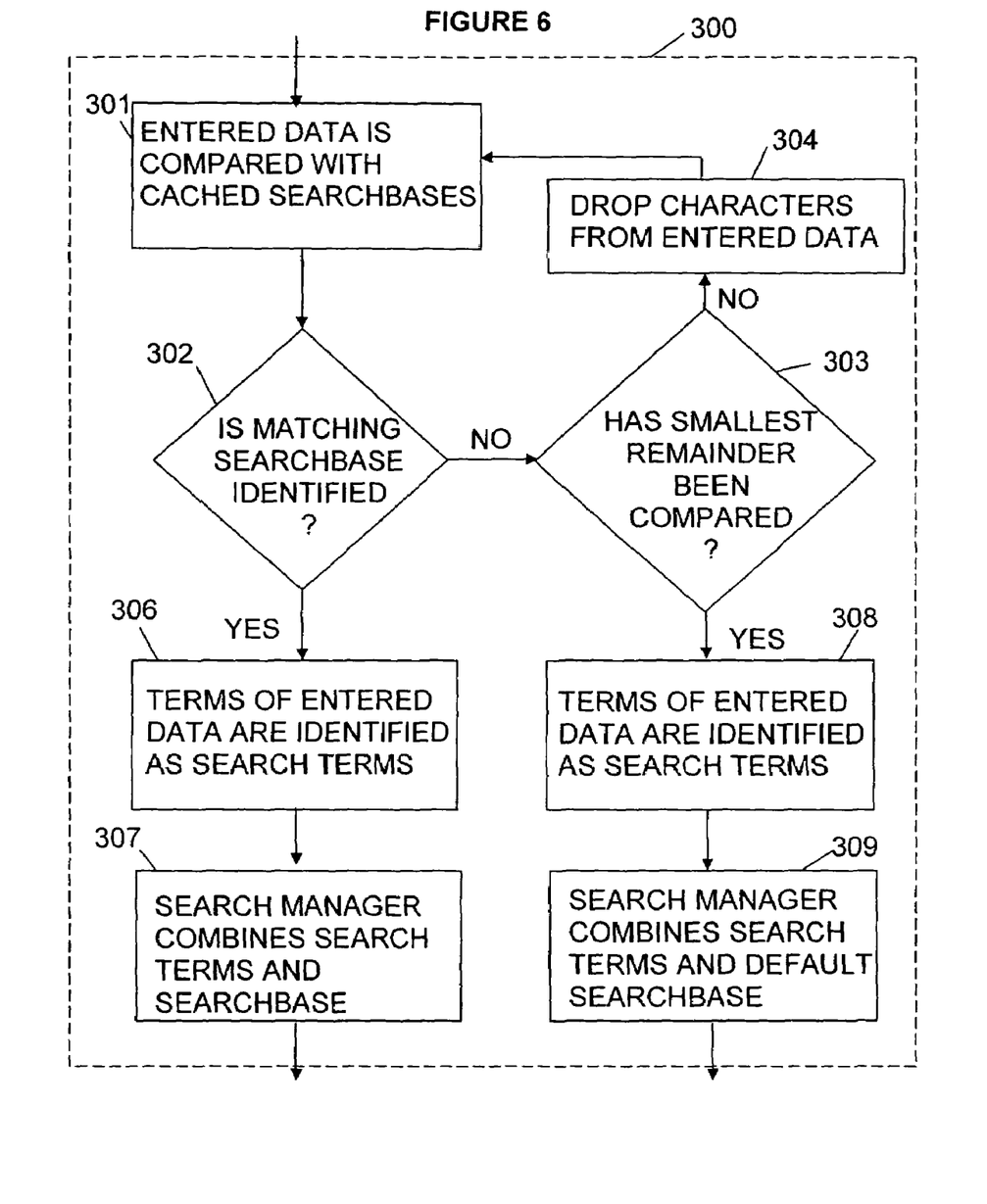
FIG. 6 shows an alternate, detailed sequence of steps represented as step 300 in FIG. 4.
Figure 7A:
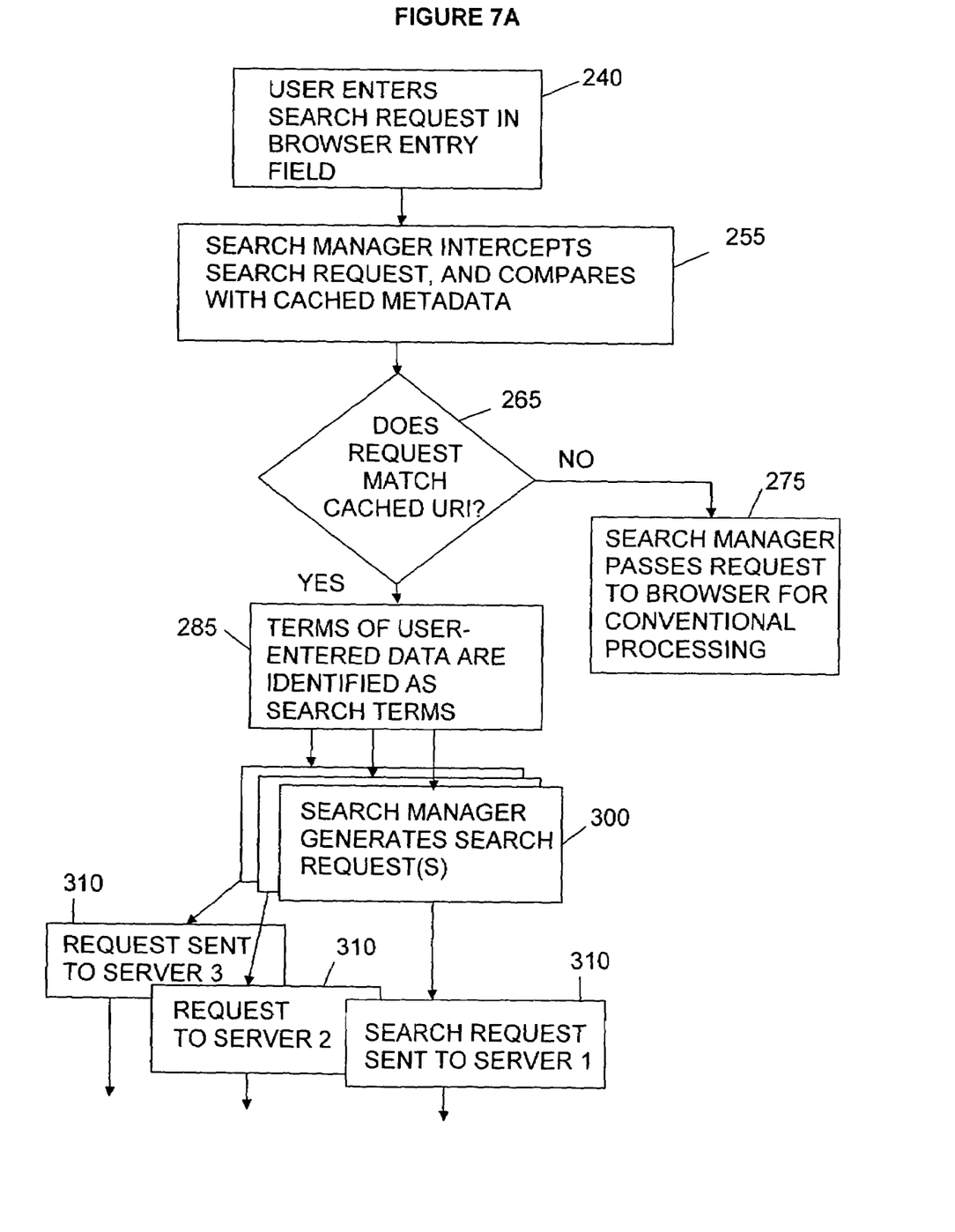
FIGS. 7A and 7B shows a sequence of steps of a computer program for searching in response to user-entered data, in accordance with another embodiment of the invention.
Figure 7B:
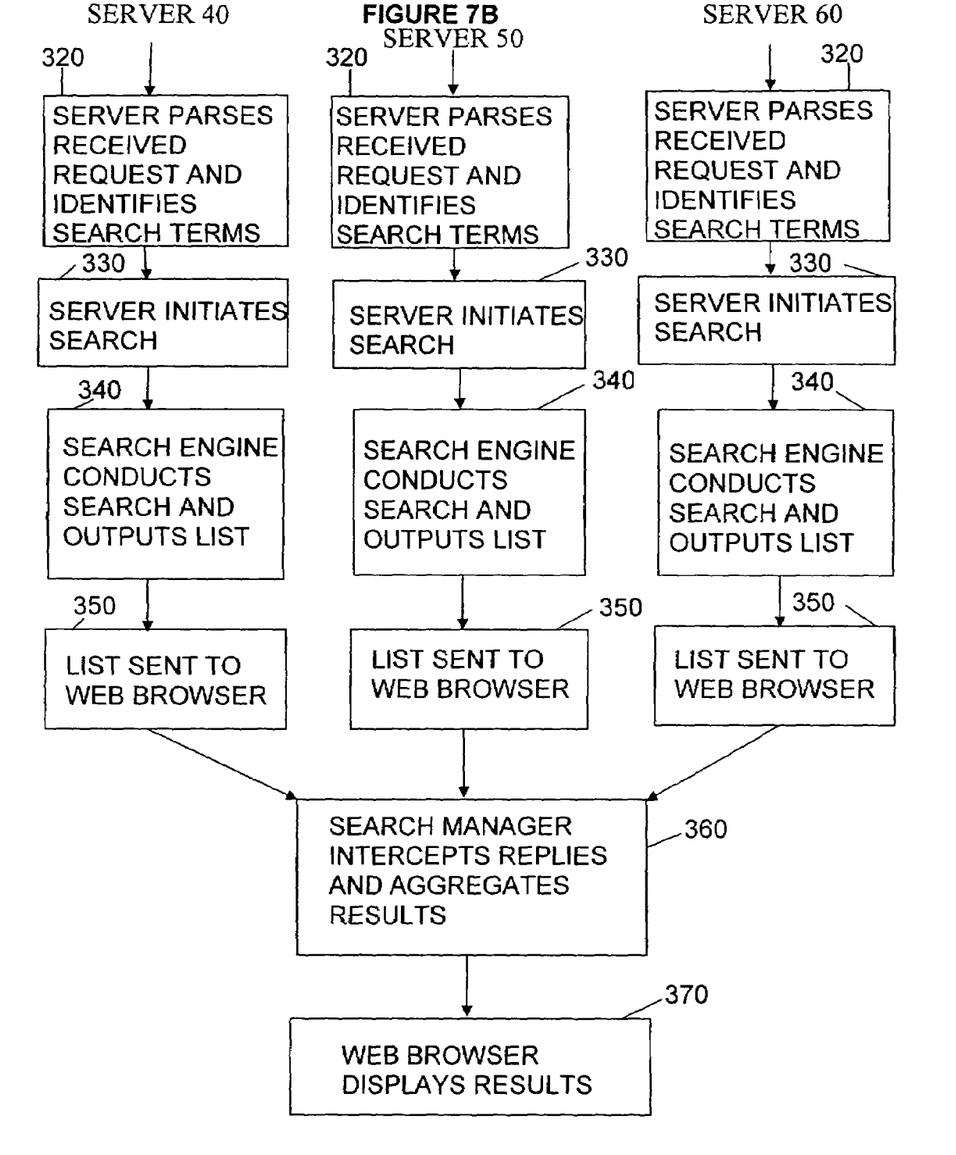

FIG. 1 illustrates the components and interactions taking place between search manager 90, a Web Browser 80 and a number of Web servers 10, 20, 30 during performance of an example set of search-related operations according to a first embodiment of the present invention. FIG. 3 is a flow diagram representing the sequence of operations up to and including caching meta data in the Browser's cache 120. FIGS. 4 and 7 are flow diagrams showing two examples of the sequence of operations when a user subsequently enters a search request in a Browser's entry field 100. FIGS. 5 and 6 show further details of one of the steps of FIG. 4, according to two alternative embodiments of the invention. The operations shown in FIGS. 1 and 3-7 are described in detail below.

A user of a first client computer requests a Web page from a first Web site—for example, entering a URL request 'http://www.abcd.com' within an entry field 100 of the user interface of the user's local Web Browser 80 (step 200). As is well known in the art, the first part of a URL specifies the communication protocol, whereas 'www.abcd.com' maps to the network address of a specific Internet-connected server computer 60 for accessing Web pages on that computer. Typically, a Web server program running on the server computer provides access to a number of hierarchically-organised and hyperlinked Web pages within a Web site. Typically, the Web site home page is initially retrieved in response to a request which specifies only the base URI at the root of the hierarchy for the site (address 'www.abcd.com' in this example). The Web server program 30 running on the server 60 returns the requested Web page to the client data processing apparatus running the Web Browser, in accordance with conventional HTTP request-response processing (step 210). The returned page incorporates meta data 140 within the HTML source of the page, for example:

<meta name="SEARCHBASE" value="http://www.abcd.com/search?term=">.

The client Web Browser 80 receives the page from the Web server program 30, and the search manager 90 parses the HTML to identify any tag name and value pairs corresponding to a predefined tag format for search meta data: <meta name="SEARCHBASE" value=" . . . ">. (step 220). This identifies the embedded meta data, and the search manager controls the Web Browser to extract (step 220) and save (step 230) the meta data in the Web Browser's cache storage 120. In the above example, the searchbase specified in the meta data is a base portion of a URI for search requests—identifying the HTTP communication protocol, the Web site 'www.abcd. com', and a special search character string 'search?term='. The specific search character string given in this example is not limiting on the invention, but is an example of a search character that may be used at a Web server to which the request is sent to indicate that appended alphanumeric characters are search terms.

Having cached the meta data including the base URI, the search manager 90 is able to initiate a Web-site-specific search in response to a user entering search text into the Web Browser's user entry field 100 (step 240). Initiation of a search according to a number of different embodiments of the present invention is described hereafter.

Search Initiated in Response to Resource Access Failures

The search manager 90, according to one embodiment of the present invention, initiates a search in response to standard client-server request-response interactions failing to find a requested resource—such as for handling HTTP 404 "resource not found" errors. In another embodiment of the present invention, search manager 90 initiates a search in response to a determination that data entered within a client requester program's entry field does not conform to the syntax requirements for resource requests. Described below is a specific embodiment in which search manager 90 responds to any one of a number of different error conditions (such as invalid syntax and 'resource-not-found' errors) by initiating a search.

As explained above, it is known in conventional file transfer request processing within the World Wide Web Internet service for a Web server to check the syntax of URIs within received client requests. In the case of Hypertext Transfer Protocol (HTTP) requests, an invalid request syntax is conventionally reported to the requesting client as an error using HTTP status code 400. URI syntax rules are set out in the Internet Engineering Task Force's (IETF's) Request for Comments 1630, Tim Berners-Lee, 1994.

Also as explained above, another failure scenario corresponds to failure by a receiving server to locate a requested Web page or other resource. Within conventional HTTP processing, failure to find a requested Web page is reported to the requesting client using the HTTP status code 404 ("Resource Not Found" error code). Other 4XX HTTP status codes are known for reporting apparent error conditions relating to client requests. A number of 5XX HTTP status codes are known for reporting problems where the server appears to have erred.

In the illustrated embodiment, client requests may be sent to the target server in a conventional manner, such as using HTTP (step 250), in response to a user entering data in a client requester program's data entry field (step 240). The target server processes the request upon receipt (step 260). If an error occurs, the target server generates a HTTP 4XX or 5XX error report as is known in the art, and sends the error report to the client requester program (step 280). Similar error reports can be generated if a directory search fails to identify a relevant directory object. In accordance with the present invention, the search manager 90 intercepts responses from servers and checks for error reports (step 290). Upon identification of an error report, the search manager 90 generates a search request using at least one alphanumeric string of the failed request as a search term (step 300). Then, the user computer 70 sends the search request to the target server (step 310).

FIG. 5 shows a first, detailed example of a sequence of steps represented collectively by step 300 of FIG. 4. The data originally entered in the client requester program's entry field is analysed to derive search terms, by comparing the entered data with searchbases stored in the client requester program's cache or a bookmark file (step 301). This comparison proceeds from right to left, starting with the complete entered data and iteratively dropping characters (step 304) and comparing the remainder with cached and bookmarked searchbases (containing URIs or base portions of URIs) (step 301)

until a match is identified (decision 302, yes branch and step 306) or it is determined that no matching searchbase is held in the cache or bookmark file (decision 303, yes branch). If a match is identified between a URI portion of the entered data and a cached searchbase (decision 302, yes branch and step 306), all alphanumeric characters appended to the matching URI portion within the entered data are extracted to derive potential search terms (step 307). All non-alphanumeric characters appended to the URI portion are initially converted to spaces. The search terms are then combined with the matching searchbase (or separately combined with each of a plurality of matching searchbases) to form a new search request (or requests) (step 307).

Referring again to decision 303, no branch, where no matching searchbase is identified, one embodiment of the present invention defaults to standard error reporting (step 305), as shown in FIG. 5. In an alternative embodiment of the present invention shown in FIG. 6, a determination in decision 303, yes branch that there is no matching searchbase is followed by a step 308 of extracting alphanumeric character strings from the entered data to use as search terms. The search terms are then combined with a stored URI for a default search engine (step 309), and sent to a default search engine as shown in FIG. 4A (step 310). The received search request is identified at step 320 of FIG. 4B as a search request by the server running the default search engine, and the search engine is invoked (step 330) to perform a search to identify a set of URIs as possible alternatives to the data entered by the user (step 340). The output results are sent (step 350) to the client requester program, and are intercepted (step 360) by the search manager 90 running on the client data processing apparatus. If responses are received from multiple servers, in response to multiple requests generated by the search manager 90 (step 300), the search manager aggregates the received responses (step 360). The search manager 90 then controls the client requester program 80 to display the aggregated results (step 370).

As a first example, corresponding to FIGS. 4A, 4B and 6, assume that a user of the client requester program 80 enters the following in the "URL" field:

http://w3.bigcorp.com/emea/uk/mobile_phone/process
    (example 1)

If an HTTP 404 error is reported, the entered data is compared with URIs in stored searchbases (step 301). If a matching searchbase is identified (step 302), the matching searchbase is used to generate a new search request as follows. If the URI base portion 'w3.bigcorp.com/emea/uk' matches the URI in a known searchbase 'w3.bigcorp.com/emea/uk/?' stored in the client requester program's cache or bookmarks folder, the alphanumeric character strings following the URI base portion are identified as search terms 'mobile', 'phone' and 'process' (step 306). The search manager then combines the searchbase 'w3.bigcorp.com/emea/uk/?' with the search terms to generate a search request (step 307):

http://w3.biqcorp.com/emea/uk/?
    mobile%20phone%20process

As a second example, represented in FIGS. 4A, 4B and 6, assume that the user enters the following in the "URL" field:

mobile phone process (example 2)

In this second example, the client requester program determines that no target server has been specified (step 302, no branch and decision 303, yes branch of FIG. 6). The search manager 90 responds to this determination by generating a search request (steps 308 and 309), which combines a URI of a default search engine with the user entered data (as search terms), such as:

http://www.google.com/?mobile%20phone%20process

The search manager may generate a plurality of search requests, if URIs corresponding to a plurality of default search engines are held in the cache, such as:

http://www.google.com/?mobile%20phone%20process
http://www.yahoo.com/?mobile%20phone%20process In both the first and second examples above, the search request or requests generated in step 300 by the search manager 90 includes a search character (in this example '?') delimiting a boundary between the searchbase and the search terms, and a separator character (in this example '%20') inserted between each search term. Although any suitable character string may be selected as the search character, the question mark symbol '?' in the present example embodiment is consistent with current Internet naming and syntax conventions.

As noted above, the question mark symbol '?' is known to delimit a boundary between a URI of a queryable object and a set of words expressing a query on that object. (The use of '?' to delimit a boundary is defined in the IETF Network Working Group's Request for Comments 1630 "Universal Resource Identifiers in WWW—A Unifying Syntax for the Expression of Names and Addresses of Objects on the Network as used in the World-Wide Web", Tim Berners-Lee, CERN, June 1994). However, alternative search characters such as 'search?' may also be used, with the cached searchbases conforming to the specific requirements of the search engines at targeted servers. Because the servers provide meta data to the client requester program, the cached searchbases can include whatever syntax and data is required by the respective server's search engine, and the generated search requests simply use whatever searchbase is identified as relevant by examining the cache. Therefore, a single search manager running at the client data processing apparatus may use a number of different searchbase and search request formats.

Referring again to the first example above, the generated search request is sent to the specified Web server 'w3.bigcorp.com' and a search is initiated for the terms 'mobile', 'phone' and 'process', with a search scope 'w3.bigcorp.com/emea/uk' defined by the known searchbase. The search engine running at the server data processing apparatus identifies the URI portion and the set of search terms, because the server-provided meta data ensures that the search format conforms to the requirements of the search engine. Any Web page content identified in this way is represented in a list which is sent to the client requester program. If the above-described operations of the search manager in response to a received error report fails to produce any results, the method defaults to standard HTTP 404 'Resource Not Found' reporting.

Search Initiated in Response to Match Between Entered Data and Searchbase

In a further embodiment of the present invention, exemplified by the flow diagram of FIG. 7A, a user enters data within an entry field 100 of a client requester program 80 (step 240), and a search manager 90 compares the entered data with one or more searchbases stored in the client requester program's cache (step 255). The search manager initiates a Web-site-specific search in response to the search manager 90 identifying a match between the entered data and a stored searchbase (steps 300 and 310). The search manager may, additionally or alternatively, identify a match between entered data and a cached 'trigger' data element which is not a searchbase but is stored in association with a searchbase.

Typically, the trigger data elements are base portions of URIs, but may not be searchbases suitable for incorporation within any search request generated by the search manager. Assume that the search manager has stored meta data within the cache of a Web Browser or other client requester program, as described above. Assume also that one cached searchbase is 'www.abcd.com/search?term', and that this is stored in association with a trigger data element 'www.abcd.com/?'. Assume also that the user enters one of the following:

http://www.abcd.com/? paragliding insurance (example 3)
 or
 http://www.abcd.com/search?term=paragliding insurance (example 4)

In this case, search manager 90 intercepts each user-entered request (step 255) and compares the user-entered data with cached searchbases and other trigger data elements (steps 255 and 265). If the complete user-entered data does not match a cached searchbase or other trigger data element, the search manager iteratively drops characters and compares the remainder until a remainder partial URI is identified as matching a cached searchbase or trigger data element, or a determination is made that the entered data does not match any cached data (decision 265). In this embodiment, if there is no-match with a cached searchbase, the search manager merely passes the user-entered data string to the Browser 80 for conventional HTTP processing (step 275). However, if a match is identified between a cached searchbase or trigger data element and a portion of the user-entered data string, the search manager 90 determines that a new search request should be generated (steps 285 and 300).

Refer to example 3 above, 'www.abcd.com/?' is a cached trigger data element associated with a searchbase 'www.abcd.com/search?term='. The search manager identifies a match between the entered data and the cached trigger data element, and identifies the association with cached searchbase 'www.abcd.com/search?term=' (step 265). The terms 'paragliding' and 'insurance' which follow the trigger data element 'www.abcd.com/?' are identified as search terms (step 285), which are to be sent to a search service at the Web site identified within the searchbase (step 300).

Referring to example 4, the search manager identifies a match between the entered data and the cached searchbase 'www.abcd.com/search?term=' (step 265). The terms 'paragliding' and 'insurance' are identified as search terms, and the search manager extracts these search terms from the user-entered data string (step 285). The search manager then generates a search request which can be interpreted by a Web server's search service (step 300). In the present example, this involves the search manager combining the search terms with the relevant cached searchbase, and issuing a new search request (step 310). For each of examples 3 and 4 above, the generated search request is an HTTP Get request of the form:
 http://www.abcd.com/
  search?term=paragliding%20insurance In the simple example 4, the effect of processing by the search manager is merely to insert a separator character '%20' between the search terms, which separator character is defined to the search engine of the target Web server as a separator between search terms. However, the generated search request can be interpreted by the relevant search engine, whereas the user-entered data string was not a valid URI and so would not have been successfully resolved by the target Web server. In example 3, the matching trigger data element is related to but not identical to the searchbase, and the generated search request differs from the entered data more significantly than in example 4. In example 4, in addition to insertion of a separator character '%20', the symbol '?' has been replaced by 'search?term=' because the latter is the format required by the relevant server's search engine.

In a fifth example, the user-entered data includes a more complete URI, such as:
 http://www.abcd.com/uk/sales/search?term=paragliding insurance (example 5)

Also, the user-entered data is matched with a cached URI base portion 'www.abcd.com' (a trigger data element) and that one of the searchbases is 'http://www.abcd.com'. A search request generated by the search manager includes this searchbase and additional search context information extracted from the user-entered data ('/uk/sales'), as well as the search terms 'paragliding' and 'insurance'. As is well known in the art, the oblique line '/' indicates an hierarchical organization of the elements of the data string such that 'www.abcd.com/uk/sales' identifies the 'sales' portion of the 'uk' portion of Website 'www.abcd.com'.

In other examples, such as the example shown in FIG. 1, the meta data associated with a cached trigger URI base portion may include additional searchbase information which the search manager will use to generate secondary search requests (step 300) for sending to additional Web servers or directory servers (step 310). While the first example generated search request described above was an HTTP Get request, this is not a limitation of the invention and the generated search requests may include LDAP requests, requests for Web services, WAIS requests to databases of a wide-area information server, or alternatives such as Gopher requests.

The present invention is not limited to requiring that the cached trigger URI base portion, which is compared with a user-entered data string, is the same as the searchbase URI of any of the search requests generated by the search manager. The cached trigger URI base portion is used to determine when the search manager is required to generate a new search request (step 265), but the meta data provided by each server can include a set of searchbases that are entirely different from the trigger data element compared with entered data.

Referring to FIG. 7B, on receipt of a search request generated by the search manager 90, the receiving Web server such as directory server 10,20,30 parses the search request to determine what processing is required (step 320). (FIG. 7B illustrates three sets of steps 320, 330, 340 and 350 which are performed at servers 10, 20 and 30, respectively, when each of these servers receives a search request from search manager 90.) Typically, a receiving server recognizes any special search characters (for example, 'search?term=') and determines that the search request is a search request that should be forwarded to the server's local search engine. The Web server 10, 20, 30 invokes a search engine running on the server's local computer (step 330). The search engine determines that any data strings appended to the special search characters are search terms, and that the URI portion preceding the special search characters is a search-scope-defining identifier of a Website or portion of a Website. The search engine conducts a search, using the searchbase URI to define the scope of the search and using the data strings ('paragliding' and 'insurance') which follow the special search characters as search terms (step 340). Conventional search engines are typically able to accept an HTTP POST of information, and so the search can be initiated as described above without modification of a typical search engine. Nevertheless, the specific examples of meta data described above can be reformatted to support integration with other search mechanisms if required.

The search engine searches the content of the Website (in accordance with the defined search scope) and identifies occurrences of the search terms within the designated Web site or Web site area specified by the URI within the search request, providing its output as a list of identified Web pages or other content within the site (step 340). A Web page URL or content URI for each identified Web page is the information output and is sent to the Web Browser or other client requester program for display (step 350). Optionally, a brief extract showing an example of use of the search term within the page or other content is also output in step 340 and sent in step 350 (consistent with the presentation of information resulting from a search via the Google search engine service available at www.google.com). In step 350, the Web server 10, 20, 30 sends the search results from the respective search engine to the Web Browser 80 from which the request was sent. The search manager 90 intercepts the responses received by user computer 70 and aggregates the responses (step 360), generating a consolidated response which the search manager forwards to the Web Browser for display via Web Browser's display window (step 370). This aggregating step 360 may involve collating received search responses from different Web sites (where multiple searchbases were specified within the cached meta data) before presenting the results back to the user via the Web Browser. Specific embodiments of the invention implement filtering and ordering of replies within the aggregating step.

Described below is a further example of use of a search manager, Web Browser and Web server according to an embodiment of the present invention. When searching on-line documents provided on a corporation's intranet Website (such as 'w3.itso.bigcorp.com'), an authorized user can enter the following search request:

http://w3.itso.bigcorp.com/?bigcorp application server (example 6)

The search manager cooperates with the Web Browser to convert this to the following:

http://w3.itso.bigcorp.com/?bigcorp%20application%20server

The search manager then controls the Web Browser to send the converted search request to the Web site (w3.itso.bigcorp.com) identified by the URI. The targeted Web server recognises the received string as a search request and automatically invokes the search engine provided on the site. The search engine processes the search terms within the request and retrieves search results.

In another example, an intranet of a company Bigcorp can be searched for hardware sales. The relevant URL is 'http://w3.bigcorp.com/sales/systems'. This is not a very intuitive URL.

A search of the intranet is initiated in response to the user entering the following:

http://w3.bigcorp.com/?hardware (example 7)

because 'w3.bigcorp.com/?hardware' is a cached trigger data element stored in association with the URL 'http://w3.bigcorp.com/sales/systems' of the desired page. This acceptance of a less specific user-entered URI, and initiation of a search for user-entered search terms, may facilitate the users experience of the site. In particular, automated initiation of a search, without having to crawl through Web pages to locate the search capability within the site, may improve the user's ability to locate information. A solution according to one embodiment enables automated initiation of a search which is automatically restricted to a particular branch of a Web site, if a relevant searchbase for that branch is held in the Web Browser's cache. For example, consider user-entered search request information:

w3.bigcorp.com/emea/uk?mobile working (example 8)

This would return only those results under the UK branch if 'w3.bigcorp.com/emea/uk?' is a cached searchbase, whereas a similar searchbase 'w3.bigcorp.com/?' would broaden the scope of the search to the root of the intranet. The URI portion of a searchbase can thus be used as an implicit filter for the scope of the search.

Using the methods and mechanisms described above, the searching of a Web site may be performed without the need for a user to search out a link to the Web site's search engine, and without the user losing his or her current position in the URL tree. A Web server may provide information relating to a specific Web site to the search manager on the client data processing apparatus. The provided information is subsequently used by a search engine running at the Web server to determine how searches should be performed within the context of the specific Web site.

Search Initiated in Response to Special Search Character

In a further embodiment of the present invention, the search manager 90 is responsive to the presence of a special search character within user-entered data, and only generates a search request in response to determining the presence of a special search character within the user-entered data. In the absence of a special search character within the data entered in the client requester program's entry field, the search manager passes the user-entered data to the client requester program for conventional HTTP processing. By defaulting to normal client-server interactions, the only overhead associated with processing by the search engine in the absence of a search character is the step of checking for a search character.

Although any suitable character string may be selected as the search character, there are benefits in selecting a search character string which is reasonably intuitive for users wishing to initiate a search and, as mentioned earlier, which does not conflict with meanings assigned to the character string in current Internet naming and syntax conventions.

Search Initiated by User Selection of Search Option

In a further embodiment of the invention, a plug-in search manager for use with a Web Browser controls the Web Browser to display a dedicated search request entry field within the Web Browser user interface. Such an embodiment may avoid the step of the search manager intercepting data strings entered into the main data entry field of the Web Browser, and does not require the user to type special search characters, because standard URIs are differentiated from search requests by virtue of which entry field the user chooses to enter data. With such an embodiment, the user still gains the benefit of not having to hunt for a search entry field within a downloaded Web page, because the dedicated search field is displayed within the Browser's interface separately from the Web page content.

A further embodiment provides a plug-in search manager for use with a Web Browser which controls the Web Browser to display, within the Browser's user interface, a user interface element for selecting a search option. The user interface element may be displayed as a 'Search' button, a drop-down menu item, or a function within a task bar, which can be selected by conventional user interactions such as input device pointer positioning clicking a mouse button. In response to conventional user-initiation of requests, the Web Browser sends http requests to specific Web servers identified in the URI of each request. If the requested resource is a Web page which is accessible at the identified server, the server returns the page to the Browser using standard http communications. If the user now selects a search function by interaction with the 'Search' interface element, search manager 90, running on the client data processing apparatus of the Web Browser, scans the downloaded page for a search entry field or form. The input cursor jumps to the first search entry field or form which is identified within the downloaded page (if any). If no such search form or field is identified within the downloaded page, the search manager is configured to cause the input cursor to jump to the main Web Browser entry field and to obtain search-related meta data from the server. This may involve accessing meta data extracted from the downloaded page and held in cache storage (as described above in relation to alternative embodiments). Any search terms entered by the user are combined with searchbase information within the retrieved meta data, as described above in relation to alternative embodiments. If no such meta data is available, the search manager may be configured to generate a search request for sending to a default search engine (as described above).

Further Embodiments

As will be apparent to persons skilled in the art, a number of alternative implementations of the present invention are within the scope of the invention as set out in the claims. In one embodiment, search-related meta data can be provided by a Web server to a search manager in response to a request from the search manager or an associated Web Browser, without necessarily being embedded within the HTML content of a Web page. Such non-embedded meta data may be sent to the Browser with downloaded Web content or separately. In a further alternative embodiment, the special search character referred to above is a prefix to a string of data, such as 'search://', which is entered by users when wishing to initiate a search. The subsequent data string can include a URI and search terms. A search manager cooperating with a Web Browser, or program code within the Browser, responds to such a prefix by sending a search request to a Web server, identified by reference to the URI, via a specific predefined protocol (such as HTTP). The destination Web server is identified in meta data, as described above. In alternative embodiments to those described above in detail, the Web Browser may be replaced by another client requester program, such as a requester program for requesting Web services or GRID services, and the meta data may be stored in a data storage unit other than a Browser's cache.

In another embodiment of the invention, searchbases stored in the storage unit may be configured for generation of a request for assistance other than an HTTP Post of a search request. For example, an error identification may trigger generation of a request for assistance which is sent to a help desk identified by the searchbase. The request for assistance may include the search terms and the error identification. The request for assistance may, for example, be sent to a telephone help desk. A method for automating requests for assistance according to this embodiment comprises the steps of: storing, in a storage unit at a client data processing apparatus, at least one searchbase identifying a service provider; in response to an error condition resulting from data entered within an entry field of a client requester program running on the client data processing apparatus, identifying at least one query term within the entered data, retrieving a searchbase from the storage unit, and generating a request for assistance which includes the at least one query term; and sending the generated request for assistance to the service provider identified by the retrieved searchbase.

The invention claimed is:

1. A method for initiating a search at a web server, said method comprising the steps of:
   storing as a bookmark of a web browser in a client computer a valid URL of a web server;
   receiving a request entered by a user into a URL field of said web browser of said client computer, said request not forming a valid request for a web page; and
   in response to said request entered by said user, attempting to send said request to an address indicated by said request, and in response, receiving an error message indicating that said address indicated by said request is not a valid address of a web page, and in response, determining that initial characters of said request match an address segment or all of said valid URL stored as said bookmark in said client computer and determining that subsequent characters of said request define search terms in improper format, and in response, reformatting said request as a proper request for said valid URL with search terms in proper format appended after said valid URL, and sending the reformatted request with said valid URL and the appended search terms in proper format to said web server addressed by said valid URL to conduct a search based on said search terms.

2. A method as set forth in claim 1 wherein said search terms in improper format comprise search terms without a proper separator character between an adjacent two of said search terms; and the reformatting step adds said proper separator character between the two adjacent search terms.

3. A method as set forth in claim 1 wherein said request entered by said user does not include a proper search character delimiting a boundary between said address segment or said valid URL and said search terms; and the reformatting step adds said proper search character delimiting said boundary between said address segment or said valid URL and said search terms.

4. A computer program product for initiating a search at a web server, said computer program product comprising:
   a computer readable media;
   first program instructions to store as a bookmark of a web browser in a client computer a valid URL of a web server;
   second program instructions to receive a request entered by a user into a URL field of said web browser of said client computer, said request not forming a valid request for a web page; and
   third program instructions, responsive to said request entered by said user, to attempt to send said request to an address indicated by said request, and in response, receive an error message indicating that said address indicated by said request is not a valid address of a web page, and in response, determine that initial characters of said request match an address segment or all of said valid URL stored as said bookmark in said client computer and determine that subsequent characters of said request define search terms in improper format, and in response, reformat said request as a proper request for said valid URL with search terms in proper format appended after said valid URL, and initiate sending of the reformatted request with said valid URL and the appended search terms in proper format to said web server addressed by said valid URL to conduct a search based on said search terms; and wherein said first, second and third program instructions are stored on said media.

5. A computer program product as set forth in claim 4 wherein said search terms in improper format comprise search terms without a proper separator character between an adjacent two of said search terms; and said third program instructions add said proper separator character between the two adjacent search terms.

6. A computer program product as set forth in claim 4 wherein said request entered by said user does not include a proper search character delimiting a boundary between said address segment or said valid URL and said search terms; and said third program instructions add said proper search character delimiting said boundary between said address segment or said valid URL and said search terms.

7. A computer program product as set forth in claim 4 further comprising:

fourth program instructions, responsive to said error message indicating that said address indicated by said request is not a valid address of a web page, to determine that said request does not match an address segment or all of any valid URL stored as a bookmark in said client computer and determine that said request defines search terms in improper format, and in response, identify a default URL and form a proper request for said default URL by appending said search terms in proper format after said default URL, and initiate sending of the proper request with said default URL and the appended search terms in proper format to said web server addressed by said default URL to conduct a search based on said search terms; and wherein said fourth program instructions are stored on said media.

8. A computer system for initiating a search at a web server, said computer system comprising:

a processor;

a computer readable media;

first program instructions to store as a bookmark of a web browser in a client computer a valid URL of a web server;

second program instructions to receive a request entered by a user into a URL field of said web browser of said client computer, said request not forming a valid request for a web page; and third program instructions, responsive to said request entered by said user, to attempt to send said request to an address indicated by said request, and in response, receive an error message indicating that said address indicated by said request is not a valid address of a web page, and in response, determine that initial characters of said request match an address segment or all of said valid URL stored as said bookmark in said client computer and determine that subsequent characters of said request define search terms in improper format, and in response, reformat said request as a proper request for said valid URL with search terms in proper format appended after said valid URL, and initiate sending of the reformatted request with said valid URL and the appended search terms in proper format to said web server addressed by said valid URL to conduct a search based on said search terms; and wherein said first, second and third program instructions are stored on said media for subsequent processing by said processor.

9. A computer system as set forth in claim 8 wherein said search terms in improper format comprise search terms without a proper separator character between an adjacent two of said search terms; and said third program instructions add said proper separator character between the two adjacent search terms.

10. A computer system as set forth in claim 8 wherein said request entered by said user does not include a proper search character delimiting a boundary between said address segment or said valid URL and said search terms; and said third program instructions add said proper search character delimiting said boundary between said address segment or said valid URL and said search terms.

11. A computer system as set forth in claim 8 further comprising:

fourth program instructions, responsive to said error message indicating that said address indicated by said request is not a valid address of a web page, to determine that said request does not match an address segment or all of any valid URL stored as a bookmark in said client computer and determine that said request defines search terms in improper format, and in response, identify a default URL and form a proper request for said default URL by appending said search terms in proper format after said default URL, and initiate sending of the proper request with said default URL and the appended search terms in proper format to said web server addressed by said default URL to conduct a search based on said search terms; and wherein said fourth program instructions are stored on said media for subsequent processing by said processor.

* * * * *